June 1, 1954

R. S. FORD
WORK HOLDER FOR JOINTER PLANERS
AND OTHER WOODWORKING MACHINES 2,679,871

Filed July 19, 1950

INVENTOR.
Robert S. Ford

June 1, 1954

R. S. FORD 2,679,871

WORK HOLDER FOR JOINTER PLANERS
AND OTHER WOODWORKING MACHINES

Filed July 19, 1950

INVENTOR

Robert S. Ford

June 1, 1954

R. S. FORD 2,679,871

WORK HOLDER FOR JOINTER PLANERS AND OTHER WOODWORKING MACHINES

Filed July 19, 1950

INVENTOR

Robert S. Ford

June 1, 1954

R. S. FORD 2,679,871

WORK HOLDER FOR JOINTER PLANERS AND OTHER WOODWORKING MACHINES

Filed July 19, 1950

INVENTOR

Robert S. Ford

Patented June 1, 1954

2,679,871

UNITED STATES PATENT OFFICE 2,679,871

WORK HOLDER FOR JOINTER PLANERS AND OTHER WOODWORKING MACHINES

Robert S. Ford, Pascagoula, Miss.

Application July 19, 1950, Serial No. 174,763

8 Claims. (Cl. 144—249)

My invention relates to improvements in work holders for woodworking machines, in which the mechanical work holder serves to hold the workpiece against the bed and fence of the machine as it is traversed over the rotating cutter head. It presently appears that the most valuable application of this invention is for jointer planer machines, and the embodiments herein described illustrate application to this type of machine, however it must be understood that some of the inventive principles involved are useful on machines of other types.

When using a jointer planer not fitted with such a work holder, the operator is required to manually hold down the workpiece and push it over the machine bed with his hands in hazardous proximity to the cutter head. Manual operation of a jointer planer without a work holder is extremely dangerous often resulting in serious maiming accidents to the hands. The frequency of such accidents over a long period of time has given the jointer planer the reputation of being one of the most dangerous of all the standard woodworking power tools. Consequently the need for a satisfactory mechanical work holder on these machines has been known for many years, and various devices for the purpose have been developed in the prior art, though none has proven satisfactory enough to merit general acceptance due to various shortcomings and defects which have been avoided in the subject invention by mechanical principles and combinations of elements widely different from anything developed in the prior art.

This work holder completely relieves the operator from any exertion toward guiding or holding the workpiece, the only manual action required being the introduction of the workpiece and traversing it through the machine, preferably accomplished with a push stick. Even the manual traversing or feeding may be eliminated by applying the power feed construction as in Fig. 10.

From an operative or functional viewpoint, the general principles are as follows: The hold down wheels or other pressure elements apply pressure to the workpieces in an extremely sensitive and flexible manner, being capable of riding over large irregularities on the work with practically no change in pressure. The application of pressure is concentrated over a laterally narrow area, causing the workpiece to align against the machine table rather than against the work holder pressure element. Lateral adjustment permits locating this pressure area to best advantage for varying width in workpiece. Vertical adjustments and spring stops allow locating for easy entry of work. Effective means are provided for guiding the workpiece against the fence. Quick disposal or removal of the device and rapid adjustment characteristics are provided.

The principal object of the invention is readily seen to be the safeguarding of the operator.

Another object is to improve the quality of the work.

A further object is to increase the speed of operation to a marked degree as compared with hand operation.

Another object is to provide for the planing of very long planks by one operator.

Still another object is to provide power operated feed.

A further object is to lessen the fatigue and nervous strain of the operator by eliminating the necessity for manual holding down.

A still further object is to provide for quick adjustment and removal.

In the drawings (4 sheets):

Figure 4:
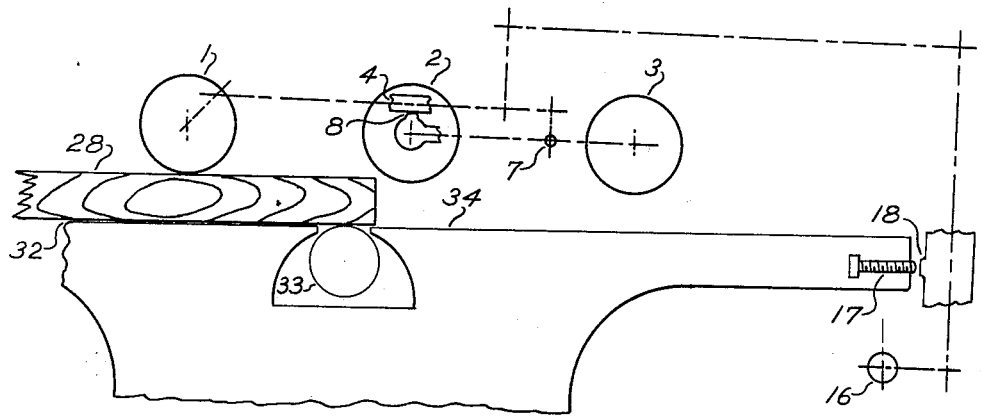
Figure 5:
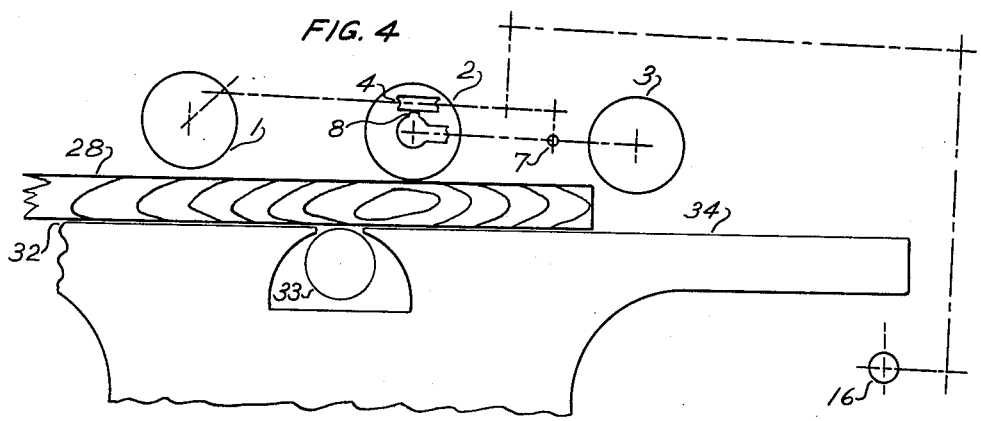
Figure 6:
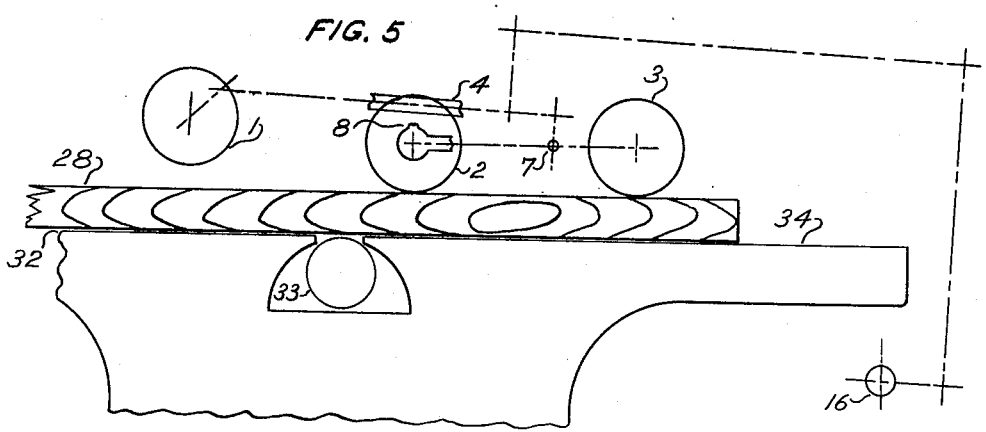

Figs. 4, 5, and 6 are a series of motion diagrams showing the operation of the work holder.

Figure 7:
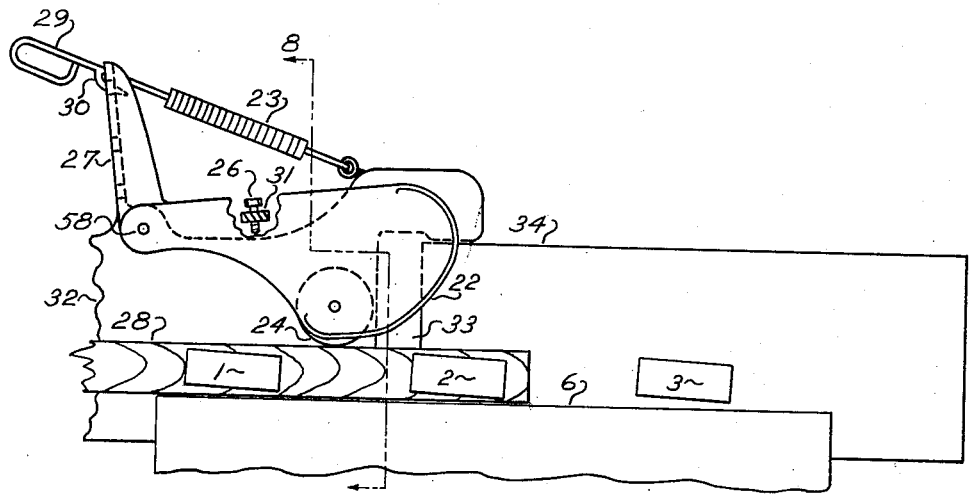

Fig. 7 is a plan view showing the combination guard and work holder.

Figure 8:
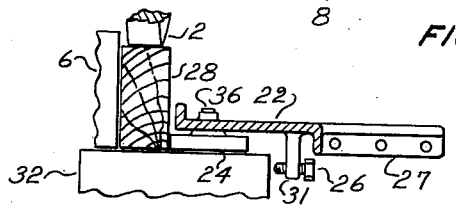

Fig. 8 is a sectional view taken on line 8—8 in Fig. 7, showing combination guard and work holder.

Figure 9:
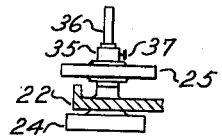

Fig. 9 is a portion of Fig. 8 modified to show an alternate construction embodying a second wheel on the flap guard.

Figure 10:
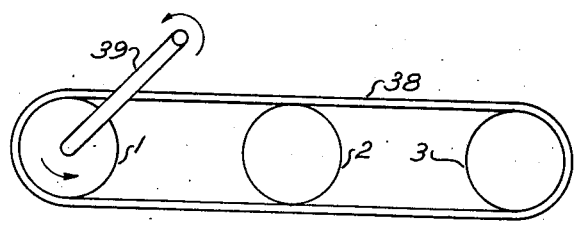

Fig. 10 is a partial elevation showing an alternate construction for applying power feed.

Figure 11:
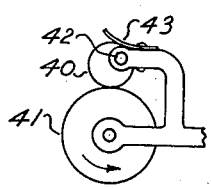

Fig. 11 is a partial elevation showing an alternate construction embodying a backstop on the wheels.

Figure 12:
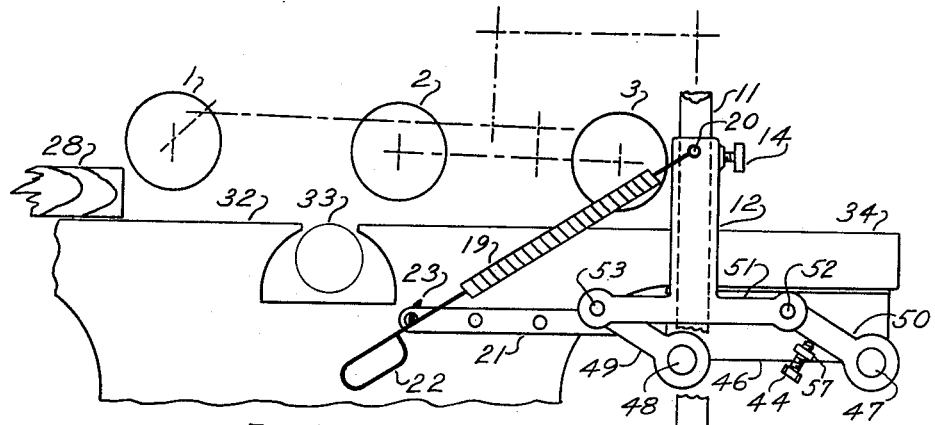

Fig. 12 is a partial elevation showing an alternate construction embodying a parallel link type support.

Figure 13:
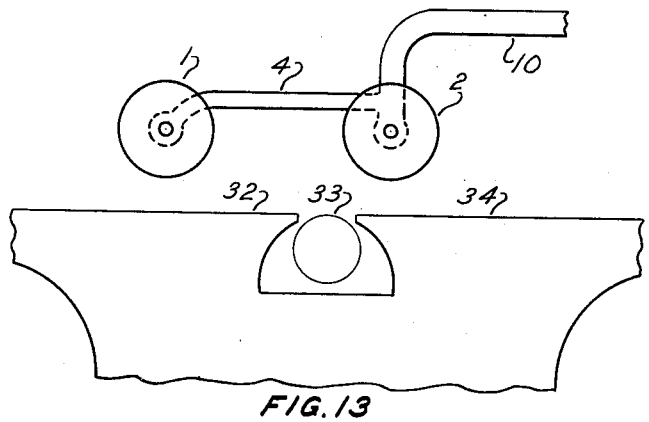

Fig. 13 is a partial elevation showing an alternate construction employing two wheels in lieu of three.

Figure 14:
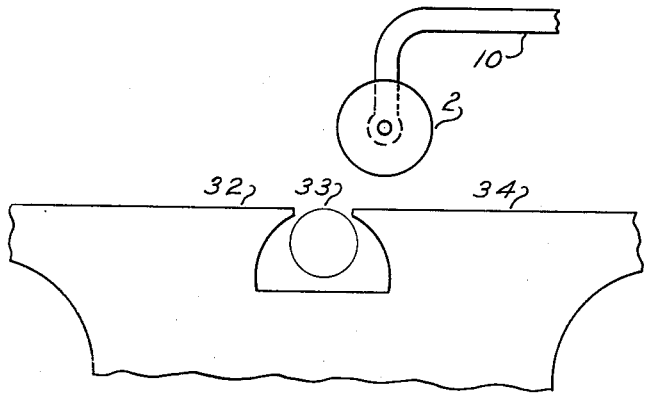

Fig. 14 is a partial elevation showing an alternate construction employing one wheel in lieu of three.

The selected embodiment of the invention is described in detail in the following paragraphs referring to Figs. 1, 2, and 3.

The treads of the presser wheels 1, 2, and 3 are preferably made of soft resilient rubber, and are rotatably mounted on beams 4 and 5. The wheels are aligned with the axes lying approximately in a horizontal plane, but skewed laterally as shown in Fig. 2 so as to continuously track the workpiece 28 toward the fence 6 as the workpiece is advanced from left to right.

The beam 5 is articulated to the beam 4 by a rotatable cylindrical bearing 7, and thereby is free to tilt in see-saw fashion with respect to beam 4, except as limited by stop lug 8 in the clockwise direction and as restrained by spring 9 in the counter-clockwise direction. In other words, when not engaging a workpiece beam 5 is held parallel to beam 4 by the force of spring 9 acting through beam 5 against stop lug 8, but the spring force is relatively light and can be easily overcome and beam 5 tilted counterclockwise when a workpiece goes under wheel 3 as in Fig. 6, thus allowing both wheels 2 and 3 to ride a workpiece simultaneously, each wheel taking its proportionate load. Beam 5 is not permitted to swivel or skew laterally since bearing 7 has only one axis of rotation. The bearing 7 is substantially in line with the wheels, avoiding overhung loading.

Beam 4 is rigidly bolted to beam 10 at flange 55. This construction allows the wheel assembly to be aligned properly at installation, and also permits the attachment to be accommodated to jointer-planers of various lengths, by suitably selecting the location for the joint with flange 55 and drilling the beam 4 accordingly. However, beams 4 and 10 may be operatively considered as one rigid beam.

Beam 10 is attached to suspension bar 11 by a sleeve 54 which engages suspension bar 11 slidably but not rotatably, the bar 11 being shown with a triangular form to prevent rotation. Other polyhedral or non-circular forms may be used, or a splined or keywayed round bar may be used. A thumbscrew 13 is used to lock sleeve 54 in the selected lateral position. This arrangement of sliding suspension permits lateral adjustment of the wheels across the machine bed to any desired position, but does not permit relative rotational shifting between beam 10 and bar 11.

The suspension bar 11 is supported in a hollow swinging support member 12, wherein it has the same slidable but non-rotatable fit described in the preceding paragraph. A thumbscrew 14 is fitted to lock the suspension bar 11 at any desired height setting in support 12 to accommodate workpieces of varying thickness.

The swinging support 12 is carried by a shaft 16 to which it is rigidly clamped. The shaft 16 is rotatively supported in a double bearing hanger 15 which is bolted rigidly beneath the table of the jointer planer. The thrust collar 24 retains shaft 16 in bearing hanger 15 and prevents endplay. The assembly of wheels and beams is thus shown to be supported on a freely rotative shaft 16 which allows rotation in a vertical plane only, with no horizontal or lateral freedom. The rotative motion of this assembly in a counter-clockwise or downward direction is limited by the adjustment stop formed by the set screw 17 threaded into a lug extended from bracket 15 and the lug 18 on the swinging socket 12. This set screw 17 is adjusted at installation to support the row of wheels in an approximately level position. It is then left at this setting permanently, and serves to hold the wheel assembly up when a workpiece is not under it. This stop effect is very important, as without it the wheels would drop down on the table and make it inconvenient to introduce the workpiece. Also the vertical and horizontal adjustments become inconvenient without the stabilizing effect of this support stop.

The spring 19 serves to provide the necessary downward pressure on the wheels by tension applied on the lug 20 on swinging support 12, which creates a constant counter-clockwise torque on the whole pivoted assembly rotative in bearing hanger 15. At rest this torque is resisted by set screw 17 but when a workpiece is introduced under wheel 1 the slight raising of the wheel tilts the assembly clockwise clear of the set screw 17 and thereby the force of the spring is allowed to become effective in holding the wheels down on the workpiece. To meet the need for varying degrees of wheel pressure, the multi-position spring anchor bracket 21 is provided. By means of handle 22 the hook 23 may quickly be shifted to any of the multiple holes in anchor bracket 21 to obtain pressure variation. The spring may also be entirely released and the weight of the wheel assembly alone used for small work. The combination formed by the bearing bracket 15, shaft 16, support 12, lug 18, set-screw 17, spring 19, handle 22, hook 23, and anchor 21 is thus seen to be a very important basic assembly whereby the remainder of the work holder is supported, tensioned, and stowed. The action obtained by the spring tension being neutralized at rest by the stop yet automatically available as needed is very valuable. Without such a stabilized arrangement the device would be inconvenient to use because the wheels would drop down on the table when a workpiece is not under them.

To properly describe the function of this embodiment of the invention it is necessary to first review the theory and operation of the basic jointer planer as used without a work holder. The normal mode of operation is to lay the workpiece on the front table 32 and, holding it down firmly by hand, advance it over the cutterhead 33 until a few inches of the newly planed surface overlaps the rear table 34 whereupon the downward pressure of the hands on the workpiece is entirely transferred to the portion on the rear table, meanwhile continuing to advance the workpiece steadily. The newly planed surface sliding on the rear table 34 guides the whole workpiece over the cutterhead 33 thus generating a plane surface free of warp and wind. It is evident that the pressure must be shifted from the front table to the rear table as the workpiece advances, because if pressure remains on the front table the rough and uneven surface of the unplaned portion of the workpiece sliding on the front table 32 will derange the true path over the cutterhead and spoil the finish. This shifting of pressure from front to rear is one of the unique features of the present invention, and is essential to proper operation of the machine.

This optimum action sequence is effectively obtained with the subject work holder, as may be seen from the following analysis: Referring to Fig. 1, it will be seen that the row of wheels 1, 2, and 3 are preset, by means of the vertical adjustment thumb screw 14, above the table at an elevation slightly less than the vertical dimension of the workpiece 28 which may be seen entering at the left. Fig. 4 shows in diagrammatic form the workpiece 28 after going under wheel 1 and approaching wheel 2. Note that the rising motion of the wheel 1 in mounting the workpiece 28 has tilted the entire assembly upward and cleared the stop at setscrew 17, making the spring pressure effective to force the wheel assembly downward on the workpiece 28. Fig. 5 shows the workpiece 28 after going under wheel 2 and approaching wheel 3. Note that the rising motion of wheel 2 in mounting workpiece 28 has by means of lug 8 lifted the entire assembly upward still more, thus lifting wheel 1 off the workpiece and transferring all the load to wheel 2. This accomplishes the necessary transferral of pressure from front to rear table described above. Fig. 6 shows the workpiece 28 going under both wheels 2 and 3, with both wheels exerting pressure. Note that in mounting workpiece 28 wheel 3 has raised the whole assembly still higher and has also tilted beam 5 slightly counterclockwise on bearing 7, thus allowing both wheels 2 and 3 to remain on the workpiece 28. Note that the workpiece is held down both near the cutter head 33 and well out on the rear table, with the center of pressure beneath bearing 7. This gives the theoretically and practically perfect condition in holding the workpiece down firmly on the rear table only, after the forward end of the work has passed over the cutterhead and is in contact with the rear table 34.

Use of the pivoted type support enables the wheel to ride up on the workpiece easily and smoothly, by virtue of the fact that the horizontal force of the workpiece against the wheel is directly useful in raising the assembly by exerting a torque about shaft 16. It is necessary to have the wheels mount the workpiece very smoothly to obtain a perfectly planed surface.

To accommodate workpieces of varying width and thickness, the wheel assembly is adjusted laterally and vertically by the sliding adjustments lockable by thumbscrews 13 and 14 respectively. When it is not desired to use the work holder it may be quickly tilted upward and backward off the table and thus allowed to hang suspended beneath the table out of the way. Or it may be removed by merely unlocking thumbscrew 14 and lifting the assembly with beam 11 out of the socket 12 and laying it aside. These quick removal features are very important, as there are a few specialized jointing operations where the device is not useful, and if it were not instantly removable it would in these operations be a nuisance. In tilting it back it is not necessary to unlock or detach anything. It is simply tilted over and down, the spring 19 stretching over center and then retracting.

Figures 1, 2, 3:
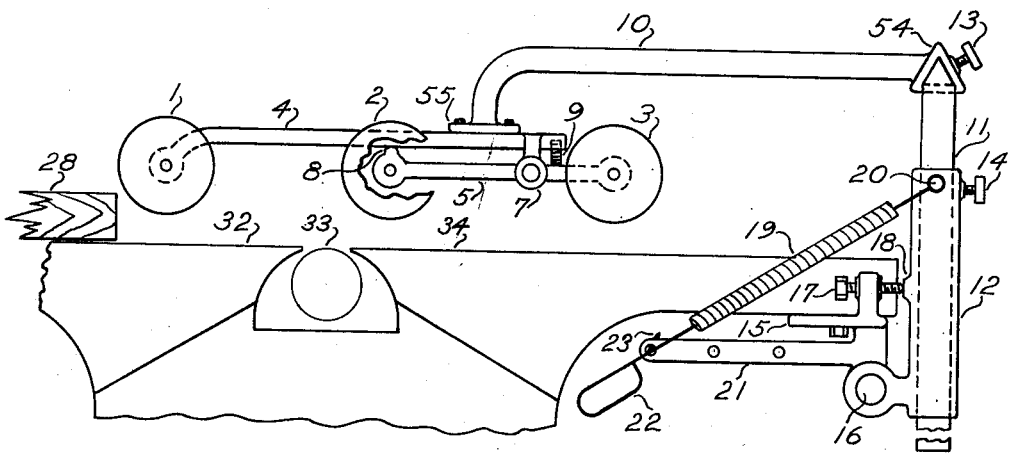
Fig. 1 is an elevation showing the work holder mounted on a conventional jointer planer with the fence removed for clarity, and viewed from the rear side.
Fig. 2 is a plan view of the jointer planer with the work holder wheel assembly only in place.
Fig. 3 is a rear elevation showing the work holder in place on a jointer-planer.

It may be noted from Figs. 2 and 3 that the beams and wheel mountings are offset away from the fence 6, so as to allow the wheels to be brought up close to the fence, permitting the engagement of very small work.

Long planks may be dressed by one operator by holding the plank near the midpoint, pushing it under the wheels for about half the length of the plank, then walking to the rear of the machine and pulling it through and out.

The skewing of wheels 1, 2, and 3, shown in Fig. 2 serves to track the workpiece 28 against the fence 6. The soft rubber of the wheels exerts a strong frictional force sidewise on the wood and urges it effectively against the fence. This alone is entirely sufficient in planing the wide side of a workpiece as in Fig. 3, but it is evident in jointing the narrow edge of a workpiece as in Figs. 7 and 8 that pressure is also needed along the bottom edge of the workpiece to keep it from tilting away from the fence at the bottom.

This sidewise pressure near the bottom edge of the workpiece is provided by the combination flap guard and work holder shown in Figs. 7 and 8, whereby the wheel 24 is caused to press on the workpiece and hold it against the fence along the bottom edge. This action complements the function of the overhead wheels in fully guiding the workpiece being jointed.

The flap guard 22 has counterparts in the prior art which are adapted to function purely as guards or covers for the cutter head. In the present invention it has been modified and fitted with new mechanical elements which form a combination useful also as a work holder as well as retaining and even improving its utility as a guard.

The wheel 24 is rotatably mounted on the guard 22 with the wheel rim projecting beyond the guard and adapted to run on the workpiece. The resilient force required to hold the wheel 24 against the workpiece 28 is provided by spring 23, one end of which is permanently anchored to the machine frame, and the other end is connected by means of the handle 29 and hook 30 to any one of the several anchor holes provided in the extended crank arm 27, which crank arm is an integral part of the flap guard 22. The flap guard is rotatably mounted on the machine frame by vertical pivot 58. It is evident that the action of the spring 23 on the crank arm 27 produces a continuous rotative torque in a clockwise direction about the pivot 58 on the entire flap guard assembly, and further that the magnitude of this torque is quickly adjustable by changing the engagement position of the hook 30 from one anchor hole to another. By this means, the effective spring action can be varied from a light force only sufficient to return the guard to closed position after being deflected, to a heavy force suitable to hold large workpieces firmly against the fence. The set screw 26 is threaded into a lug 31 on the underside of the flap guard 22, and adapted to strike the machine frame for the purpose of limiting the inward swing of the guard 22. The lateral width of the guard 22 has been reduced so that the wheel rim 24 does not reach all the way across the machine bed. This is done to minimize interference with wheels 1 and 2 and, more important, to permit easy introduction of the workpieces when using it at high tension as a work holder. In this latter case the fence 6 is set at a distance from the wheel 24 only slightly less than the thickness of the workpiece 28, so that the actual deflection of the wheel 24 as the workpiece 28 is introduced is only a fraction of an inch. If desired a thumbscrew may be substituted for setscrew 26, and used to preset the guard assembly position as desired.

In certain operations it is desirable to have the flap guard out of the way. This is quickly accomplished by releasing hook 30 and swinging the flap guard 22 aside.

It may be found desirable in various jointer planer applications to utilize certain alternate constructions, which are described in the following paragraphs.

Fig. 9 shows the use of an additional wheel 25 on the top side of flap guard 22. This construction is used on applications where the overhead work holder is not used, or where the power feed construction of Fig. 10 is used, in which cases the skewed effect of the overhead wheels would not be available. In this construction, wheel 25 is mounted on a vertically adjustable support as in Fig. 9, wherein the wheel 25 turns on a stationary flanged bushing 35, which can be slid up and down on shaft 36 and locked in the desired position by thumbscrew 37. By such means wheel 25 may be centered on a board being jointed. The upper wheel 25 should be slightly larger than the lower wheel 24 so that wheel 24 will not touch the workpiece if wheel 25 is riding it.

Fig. 10 illustrates an alternate form similar to the construction shown in Figs. 1, 2, and 3 except as shown. This form provides power feed by means of a flexible belt 38 passing around the wheels 1, 2, and 3, which in this construction are mounted with squarely aligned axes, and the treads fitted with either crowns or flanges to center the belt. Rotative mechanical power is applied to one of the end wheels of the series, preferably wheel 1, by a mechanical transmission 39, such as a flexible shaft and casing. The belt is thus caused to travel around the series of wheels and acts directly on the workpiece to both hold it down as before and traverse it over the cutterhead. The belt may be made of any flexible material with good frictional qualities, preferably a rubber composition.

Fig. 11 shows an alternate construction which may be applied to any or all of the wheel elements shown herein, to serve as an anti-kickback device, wherein the hold down wheel is permitted to rotate only in the in-feed direction, and thereby prevents the workpiece being thrown back toward the operator. This construction comprises a pawl roller 40, supported eccentrically on a pin 42 in contact with the wheel 41, and held against it by spring 43. It may be seen from the drawing that rotation in the direction indicated is unimpeded, but on commencement of reverse rotation the roller 40 knuckles against the soft frictional rubber tread of wheel 41 and prevents reverse rotation. This arrangement provides a backstop or ratchet of exceptional sensitivity and strength, thus providing reliable anti-kickback action. When the pivoted type wheel support as in Fig. 1 is used with this backstop, the frictional grip of the rubber wheels on the workpiece is increased, because the forces tending to kick the workpiece back act also to rotate the wheel assembly counter-clockwise about the shaft 16, thus driving the wheels ever tighter down on the workpiece. This gives what may be called a self energizing braking effect. This effect is obtained only by locating the shaft 16 substantially below the table 34, so that an effective moment arm may be provided.

Fig. 12 shows an alternate construction similar to that shown in Figure 1 except as shown and described. In this construction the pivoted swinging support is replaced with a parallel link type support which causes the wheel assembly to remain at the same angle with the machine table as it rises, rather than assuming a continuously increasing angle. This alternate construction may be used when it is desired to eliminate the unequal pressure distribution given by the pivoted support of Fig. 1, wherein it may be seen that the effective force applied by wheel 1 is only about half of the force applied by the combination of wheels 2 and 3, due to the fact that wheel 1 is about twice as far away from the pivot shaft 16 as the bearing 7. The parallel link type support as shown in Fig. 12 affords the same pressure on any roller, since it applies pressure by direct downward thrust rather than by torque. The wheels mount the workpiece as easily with this support as with the other type, since the whole wheel assembly moves backward as it moves up, thus utilizing the push of the workpiece to lift it.

To retain the feature of automatic transfer of pressure from front to rear table, wheels 1, 2, and 3 are mounted in descending order as named and as shown in Fig. 12, rather than initially level as in Fig. 1. The action on a workpiece is closely similar to that shown in the diagrams Figs. 4-6, differing only in that the wheel assembly does not tilt as it moves up. When the workpiece goes under wheel 1, it raises the wheel assembly, swinging the crank arm 50 clear of the set screw 44, and thus allowing the force of spring 19 to become effective. When wheel 2 mounts the workpiece, the wheel assembly is raised still more, raising wheel 1 off the workpiece. When wheel 3 mounts the workpiece, the wheel assembly is again raised but both wheels 2 and 3 remain on the workpiece due to the equalizing action at the bearing 7.

In detail, this alternate construction may be seen from Fig. 12 to comprise a double bearing hanger 46, rigidly fastened to the underside of the table 34 and rotatively supporting two shafts 47 and 48, on each of which is rigidly mounted a crank arm respectively 49 and 50. These crank arms support the two ends of a parallel bar 51 by means of joint pins 52 and 53. The bar 51 is rigidly fastened to and carries the support member 12, which is otherwise the same as previously described and shown in Fig. 1. The remainder of the wheel support construction is shown only diagrammatically in Fig. 12, as it is otherwise the same as Fig. 1, or as further modified in Figs. 13 and 14. Spring 19, hook 23, handle 22, anchor bracket 21, and lug 20 serve to apply the necessary downward force for holding the wheels against the workpiece. Setscrew 44 is threaded into a lug 57 on bracket 46, and serves to act as a stop against crank arm 50, in limiting the downward motion of the assembly and thus providing a resting point.

Though superior in performance, the additional cost of the parallel link support is probably warranted only for the larger size machines and in conjunction with the power feed modification.

Fig. 13 illustrates an alternate form similar to the construction shown in Figs. 1, 2, and 3 except as shown and described. In this form the equalizing beam 5 and wheel 3 are eliminated, leaving wheels 1 and 2 in rigid rotative mountings on the beam 4. This form is entirely practical for small machines. It retains the principal advantages of the three wheel form and the only shortcoming is a tendency to produce convex surfaces if the blades are slightly dull, due to the workpiece tending to rise up beyond wheel 2 in the absence of wheel 3 holding it down. The only justification for use of this form over the three wheel form is for lowered first cost.

Fig. 14 illustrates another alternate form similar to the construction shown in Figs. 1, 2, and 3 except as shown and described. In this form both wheels 1 and 3 and beam 5 are eliminated, leaving wheel 2 as the lone presser element. This form is intended for extreme economy application on very small jointers, and on other types of machines such as saws and shapers. Its chief shortcoming on jointer planers is that manual hold down must be used on the front table 32 until the wheel is engaged.

Throughout the description of this embodiment and alternates the means for contacting and pressing on the workpiece has been described as wheels. Other means may be utilized, such as spring blade sliders, sliding shoes, etc., though with generally decreased efficiency.

Though the embodiments described herein show the invention as applied to jointer planer machines, the actual scope of invention is considerably broader and some of the principles disclosed have other utility. I therefore do not limit all my claims to jointer planer utility, but I claim:

1. A jointer planer machine work holder comprising a bearing hanger adapted to be fastened rigidly to the rear table, a shaft rotatably mounted therein and extending transversely of the machine beneath the table top, a hollow support member having a non-circular interior cross section rigidly fastened to the shaft with the axis of the hole in the support member substantially at right angles with the shaft axis and adapted to rotate with the shaft to swing from a position entirely below the table top to a substantially upright position projecting above the table top, an extension spring fastened to the support member, a hook fastened to the spring, a handle fastened to the hook, a stationary spring anchor fastened to the machine frame and provided with a series of holes each adapted to receive the hook, a stop adapted to arrest the rotative swing of the support at the desired point of swing to said substantially upright position, a sleeve of non-circular internal cross section, a bar of non-circular cross section bent into substantially a right angle and adapted for one leg to fit closely and slidably into the hollow support member aforementioned and likewise the other leg to fit into the sleeve, locking means provided at both bar engagements, a beam rigidly fastened to the sleeve to extend horizontally longitudinally of and over the table top when said hollow support member is upright, and a wheel with soft rubber tread rotatably mounted on the beam with its axis skewed in the plane parallel to the machine table in a direction to track the workpiece against the fence.

2. A combination as in claim 1 including a second beam located beneath the first beam, a bearing pivotally connecting the two beams, a stop adapted to limit the mutual approach of the two beams at their forward ends, two more wheels mounted on the opposite ends of the second beam, and a spring holding the above-mentioned beam stop against the first beam.

3. In a work holder for machines having a cutting tool, a table forward of the tool and a table rearward of the tool, the combination comprising a pressure element for the work piece overlying the forward table, a pressure element for the work piece overlying the rearward table, means connecting both said pressure elements and adapted to transfer the total pressure from the first mentioned pressure element to the second mentioned element as the work piece passes from the forward table over the cutting tool to the rearward table, and means for adjusting the height of the pressure elements above the said tables.

4. In a work holder for machines having a cutting tool, a table forward of the tool and a table rearward of the tool, the combination comprising a pressure element for the work piece overlying the forward table, a pressure element for the work piece overlying the rearward table, means pivoted rearwardly of said tool and supporting both of said pressure elements, and resilient means for urging the pressure elements toward the work piece, said elements before contacting the work piece being disposed in a plane substantially parallel to the plane of the upper surface of the work piece and after contacting the work piece being disposed in a plane inclined to said work piece surface such that all pressure from said resilient means upon said work piece is first applied to the element overlying the forward table and then is transferred to the element overlying the rearward table as the work piece traverses the tool.

5. In a work holder, the combination as described in claim 4, said pressure elements comprising rollers, a bar having spaced bearing supports for the rollers and means for connecting the bar to the pivoted means.

6. In a work holder for machines having a cutting tool, a table forward of the tool and a table rearward of the tool, the combination comprising a pressure element for the work piece overlying the forward table, a pressure element overlying the rearward table adjacent the tool and a pressure element overlying the rearward table removed from the tool, means for supplying pressure to said elements, and means connecting all of said pressure elements, said connecting means including means for transferring all of the pressure successively from the first to the second said element and then the greater portion to the third said elements as the forward end of the work piece successively contacts said first, second and third elements, and said means including also means for adjusting the height of the said pressure elements above the forward and rearward tables.

7. In a work holder, the combination as described in claim 6, said connecting means comprising a bar connecting the two elements overlying the rearward table, a pivoted support for the element overlying the forward table and pivoted means supporting the bar from the said pivoted support, the pivots for said pivoted support and pivoted means being disposed to transfer pressure from one element to the next as aforesaid.

8. In a work holder, the combination as described in claim 6, said connecting means comprising a bar connecting the two elements overlying the rearward table, a pivoted support for the element overlying the forward table, and pivoted means supporting the bar from the said pivoted support, both said pivots being disposed to the rear of said tool, whereby to transfer pressure from one element to the next as aforesaid.

References Cited in the file of this patent

UNITED STATES PATENTS

| Number | Name | Date |
|---|---|---|
| 302,041 | Sill | July 15, 1884 |
| 400,991 | Abbott | Apr. 9, 1889 |
| 519,698 | Daly | May 15, 1894 |
| 851,302 | McClune | Apr. 23, 1907 |
| 986,782 | Trogdon | Mar. 14, 1911 |
| 996,430 | Schrier | June 27, 1911 |
| 998,873 | Couture | July 25, 1911 |
| 1,022,092 | Kelly | Apr. 2, 1912 |
| 1,022,176 | Boothby | Apr. 2, 1912 |
| 1,089,901 | Carson | Mar. 10, 1914 |

(Other references on following page)

UNITED STATES PATENTS

| Number | Name | Date |
|---|---|---|
| 1,135,168 | Edman | Apr. 13, 1915 |
| 1,311,508 | Harrold | July 29, 1919 |
| 1,313,061 | Brown | Aug. 12, 1919 |
| 1,524,121 | Drzewienski | Jan. 27, 1925 |
| 1,561,479 | Oettal | Nov. 17, 1925 |
| 1,590,336 | Whipple | June 29, 1926 |
| 1,594,772 | Fournier | Aug. 3, 1926 |
| 1,600,604 | Sorlien | Sept. 21, 1926 |
| 1,616,478 | Watson | Feb. 8, 1927 |
| 1,711,300 | Ziegler | Apr. 30, 1929 |
| 1,744,875 | Edwards | Jan. 28, 1930 |
| 1,770,106 | Johnson | July 8, 1930 |
| 1,838,653 | Bergman | Dec. 29, 1931 |
| 2,117,641 | Westlund | May 17, 1938 |
| 2,328,244 | Woodward | Aug. 31, 1943 |
| 2,347,991 | Cummings | May 2, 1944 |
| 2,525,894 | Graham | Oct. 17, 1950 |
| 2,536,627 | Copp | Jan. 2, 1951 |

FOREIGN PATENTS

| Number | Country | Date |
|---|---|---|
| 216,471 | Great Britain | May 15, 1924 |
| 139,888 | Switzerland | July 16, 1930 |